(12) United States Patent
Major et al.

(10) Patent No.: US 8,302,417 B2
(45) Date of Patent: Nov. 6, 2012

(54) AIR CONDITIONING SYSTEM WITH COLD THERMAL STORAGE AND EVAPORATOR TEMPERATURE CONTROL

(75) Inventors: Gregory A. Major, Farmington Hills, MI (US); John I. Frey, Shelby Township, MI (US); Kenneth L. Porrett, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 924 days.

(21) Appl. No.: 12/107,806

(22) Filed: Apr. 23, 2008

(65) Prior Publication Data
US 2009/0266094 A1 Oct. 29, 2009

(51) Int. Cl.
B60H 1/32 (2006.01)
B60H 1/00 (2006.01)
F25B 1/00 (2006.01)
F24F 6/00 (2006.01)

(52) U.S. Cl. .......... 62/243; 62/196.1; 62/228.1; 62/212; 62/61; 62/244; 165/203; 165/230

(58) Field of Classification Search ........... 62/89, 228.1, 62/228.4, 229, 239, 244; 165/203, 230
See application file for complete search history.

(56) References Cited

U.S. PATENT DOCUMENTS

| | | | | |
|---|---|---|---|---|
| 4,153,104 A | * | 5/1979 | Ruder | 165/48.2 |
| 4,482,009 A | * | 11/1984 | Nishimura et al. | 165/203 |
| 4,748,823 A | * | 6/1988 | Asano et al. | 62/239 |
| 4,916,916 A | * | 4/1990 | Fischer | 62/199 |
| 5,816,062 A | * | 10/1998 | Weng et al. | 62/201 |
| 6,330,909 B1 | * | 12/2001 | Takahashi et al. | 165/202 |
| 6,606,877 B2 | * | 8/2003 | Tomita et al. | 62/244 |
| 6,701,731 B2 | * | 3/2004 | Aikawa et al. | 62/225 |
| 6,708,512 B2 | * | 3/2004 | Kitamura et al. | 62/227 |
| 6,820,436 B2 | * | 11/2004 | Tomita et al. | 62/228.1 |
| 6,874,574 B2 | | 4/2005 | Forrest et al. | |
| 6,926,079 B2 | * | 8/2005 | Kensok et al. | 165/230 |
| 7,296,621 B2 | * | 11/2007 | Yonekura et al. | 165/202 |
| 2005/0039902 A1 | * | 2/2005 | Oga et al. | 165/203 |
| 2005/0086953 A1 | * | 4/2005 | Sugesawa et al. | 62/133 |

* cited by examiner

Primary Examiner — Marc Norman
Assistant Examiner — Filip Zec

(57) ABSTRACT

A system and method of operating a vehicle air conditioning system having an engine driven, fixed capacity refrigerant compressor and a compressor clutch is disclosed. The method may comprises setting a preliminary evaporator air temperature target; charging a cold storage apparatus in the vehicle air conditioning system; determining if the cold storage apparatus has reached a predetermined threshold; if the cold storage apparatus has reached a predetermined threshold, determining a new evaporator air temperature target by: determining a maximum allowable dewpoint evaporator air temperature for maintaining a passenger compartment humidity below a predetermined value; determining a maximum allowable mode evaporator air temperature based on a mode to which the vehicle air conditioning system is set; and setting the evaporator air temperature target to the lower of the dewpoint evaporator air temperature and the mode evaporator air temperature. The compressor clutch is controlled to achieve the evaporator air temperature target.

15 Claims, 4 Drawing Sheets

AIR CONDITIONING SYSTEM WITH COLD THERMAL STORAGE AND EVAPORATOR TEMPERATURE CONTROL

BACKGROUND OF INVENTION

The present invention relates generally to air conditioning systems for vehicles, and more particularly to air conditioning systems with thermal storage and evaporator temperature control.

The use of conventional air conditioning systems in vehicles reduces the fuel economy of the vehicles. Given the desire to improve the fuel economy of automotive vehicles, various systems have been employed in an attempt to reduce the fuel economy penalty caused by the air conditioning system. Some air conditioning systems employ variable capacity refrigerant compressors to adjust system capacity to cooling demands and thus improve fuel economy. However, for some automotive vehicles, variable capacity compressors may be impractical due to cost or for other reasons. These other types of air conditioning systems typically employ a fixed capacity compressor that is driven by the engine, with a compressor clutch cycled on and off to switch between full compressor capacity and zero compressor capacity.

Conventionally, for fixed capacity, belt driven compressors, the compressor on/off cycling is based on a fixed temperature or pressure of the refrigerant that maintains the evaporator temperature a few degrees above the freezing point of water. This provides maximum cooling and dehumidification while preventing evaporator icing. Then if the air exiting the evaporator is too cold for the demand in the passenger compartment, a portion of the cooled air is directed through the heater core to be re-heated. Operating at maximum cooling of the air with subsequent reheating is an inefficient way to operate the air conditioning system. Consequently, some operate this type of air conditioning system by cycling the compressor clutch on and off. But these systems account for only a few variables for air conditioning passenger comfort and so have a fairly limited temperature range that the refrigerant is allowed to fluctuate within. Thus, maximum fuel efficiency is not obtained. Moreover, the life of the compressor clutch may be greatly diminished due to a high level of compressor on/off cycling.

SUMMARY OF INVENTION

An embodiment contemplates a method of operating a vehicle air conditioning system having an engine driven, fixed capacity refrigerant compressor selectively disengageable from an engine by a compressor clutch, the method comprising the steps of: setting a preliminary evaporator air temperature target; charging a cold storage apparatus in the vehicle air conditioning system; determining if the cold storage apparatus has reached a predetermined threshold; if the cold storage apparatus has reached a predetermined threshold, determining a new evaporator air temperature target by: determining a maximum allowable dewpoint evaporator air temperature for maintaining a passenger compartment humidity below a predetermined value; determining a maximum allowable mode evaporator air temperature based on a mode to which the vehicle air conditioning system is set; and setting the evaporator air temperature target to a lower one of the dewpoint evaporator air temperature and the mode evaporator air temperature. The compressor clutch is controlled to achieve the evaporator air temperature target.

An embodiment contemplates a vehicle air conditioning system comprising an engine driven, fixed capacity refrigerant compressor; a compressor clutch operatively engaging the refrigerant compressor and configured to selectively disengage the refrigerant compressor from being driven by an engine; one of an evaporator and a refrigerant-to-liquid heat exchanger; and a cold storage apparatus being located in one of the evaporator, the refrigerant-to-liquid heat exchanger or downstream of the evaporator. The embodiment also contemplates a controller configured to set a preliminary evaporator air temperature target; charge the cold storage apparatus; determine if the cold storage apparatus has reached a predetermined threshold; and, if the cold storage apparatus has reached a predetermined threshold, determine a new evaporator air temperature target by: determining a maximum allowable dewpoint evaporator air temperature for maintaining a passenger compartment humidity below a predetermined value; determining a maximum allowable mode evaporator air temperature based on a mode to which the vehicle air conditioning system is set; setting the new evaporator air temperature target to a lower one of the dewpoint evaporator air temperature and the mode evaporator air temperature. The controller is further configured to control the compressor clutch to achieve the new evaporator air temperature target.

An advantage of an embodiment is that a higher average evaporator air temperature (EAT) is achieved without affecting the comfort of vehicle passengers. The higher EAT and cold storage increases compressor off duration, which leads to improved vehicle fuel economy, all while minimizing the long term wear on a compressor clutch by reducing the compressor on-off cycling rates. The extended compressor off time may be particularly advantageous when this air conditioning system is used in a hybrid vehicle. Also, there is improved air conditioning outlet temperature stability during the compressor on-off cycling, again maintaining desired passenger comfort levels.

DETAILED DESCRIPTION

Figure 1:
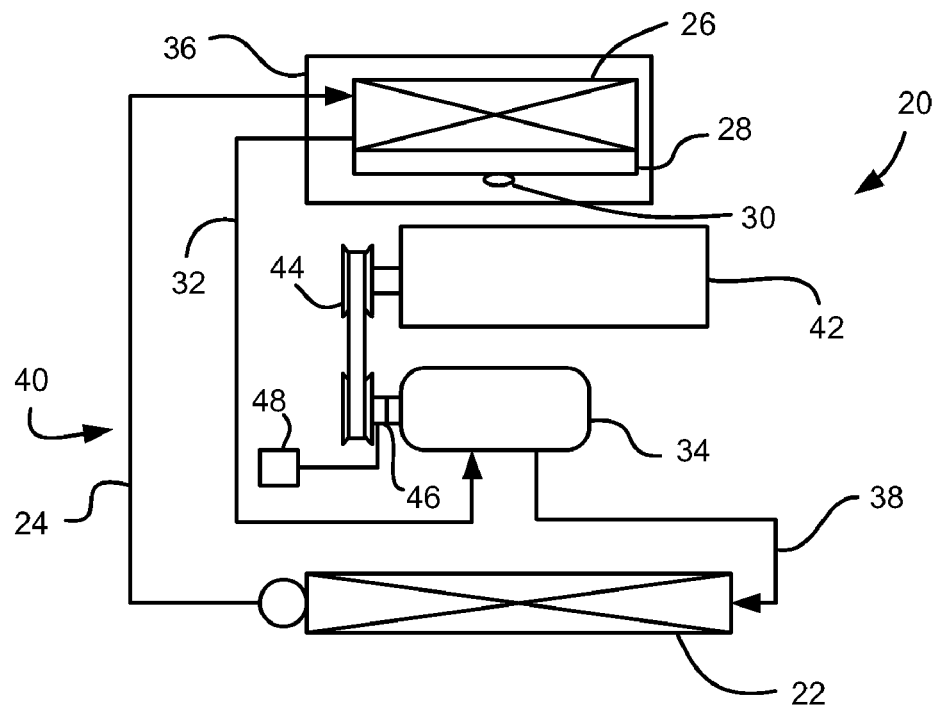
FIG. 1 is a schematic view of a vehicle air conditioning system including a cold storage feature.

Referring to FIG. 1, a vehicle air conditioning system 20 is shown. The air conditioning system 20 includes a condenser 22, where heat is drawn from refrigerant before the refrigerant is directed through a refrigerant line 24 into an integrated evaporator and thermal expansion valve assembly 26. This evaporator assembly 26 also includes a cold storage area 28 for the refrigerant. Preferably a phase change material is incorporated in the evaporator assembly 26 to increase specific heat and thermal energy stored in the cold storage area of the evaporator assembly 26. The evaporator assembly 26 is employed to absorb heat from air flowing through a heating, ventilation and air conditioning (HVAC) module 36. A thermistor 30 is located adjacent to the integrated assembly 26 and measures evaporator air temperature (EAT). The thermistor 30 may, for example, measure air temperature adjacent to the evaporator assembly 26 or may measure a temperature on an evaporator fin (not shown). Another refrigerant line 32 directs the refrigerant from the evaporator assembly 26 to a refrigerant compressor 34, which compresses the refrigerant and pushes it through a refrigerant line 38 back to the condenser 22 to complete a refrigerant loop 40. The compressor 34 is a fixed capacity type that is driven by an engine 42 via a belt-and-pulley assembly 44. A compressor clutch 46 selectively engages and disengages the compressor 34 from the belt-and-pulley assembly 44. The compressor clutch 46 is controlled by a controller 48. The determination of when the controller 48 engages and disengages the clutch will be discussed below relative to FIGS. 4A-4C.

Figure 2:
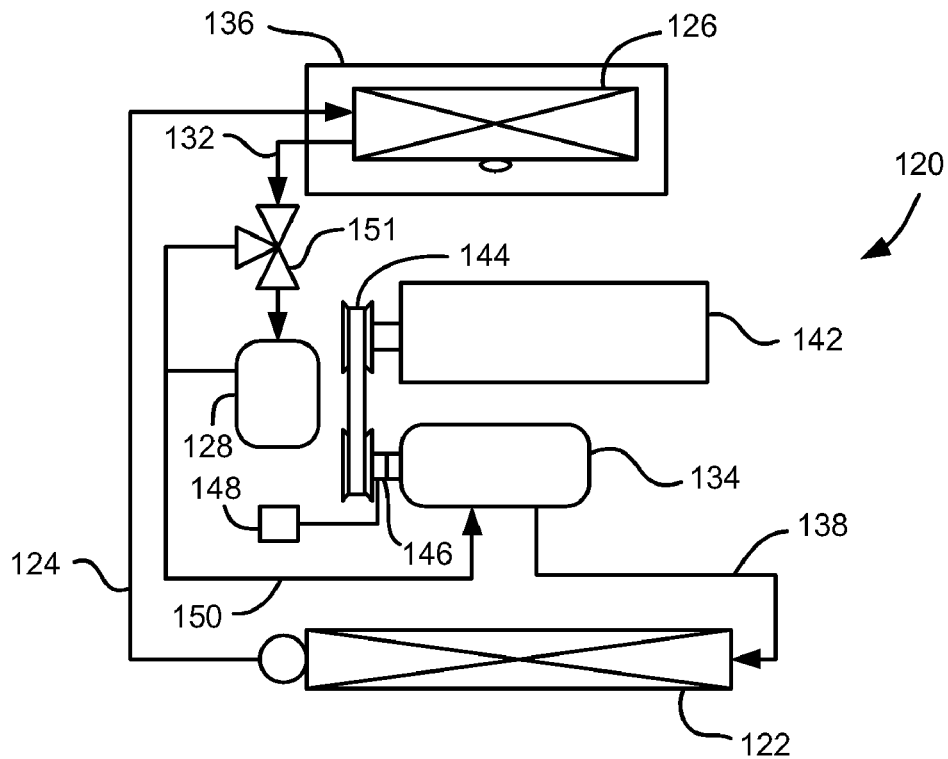
FIG. 2 is a schematic view similar to FIG. 1, but illustrating a different type of cold storage feature.

FIG. 2 illustrates a second embodiment. Since this embodiment is similar to the first, similar element numbers will be used for similar elements, but employing 100-series numbers. In this embodiment, the air conditioning system 120 still includes a compressor 134 that is driven by an engine 142 via a belt-and-pulley assembly 144 and can be selectively disengaged by a compressor clutch 146. A controller 148 still controls the engagement and disengagement of the clutch 146. The condenser 122 and refrigerant lines 124 and 138 may also be the same as in the first embodiment.

The integrated evaporator and thermal expansion valve assembly 126 in the HVAC module 136, however, does not include a cold storage area. Now a refrigerant line 132 directs refrigerant from the evaporator assembly 126 to bypass valve 151, which can selectively direct refrigerant into a separate cold storage tank 128 or bypass the tank 128. The cold storage tank 128 may include a phase change material to condense gas refrigerant, storing cold thermal energy in the tank 128. Another refrigerant line 150 directs the refrigerant from the cold storage tank 128 (or bypass valve 151) to the compressor 134. The bypass valve 151 may be employed to redirect refrigerant around the tank 128 when it is desirable to have minimum initial passenger compartment cool-down time. After the initial cool-down, the valve 151 may be switched to direct the refrigerant through the tank 128. The valve 151 is optional and may be eliminated if not desired.

Figure 3:
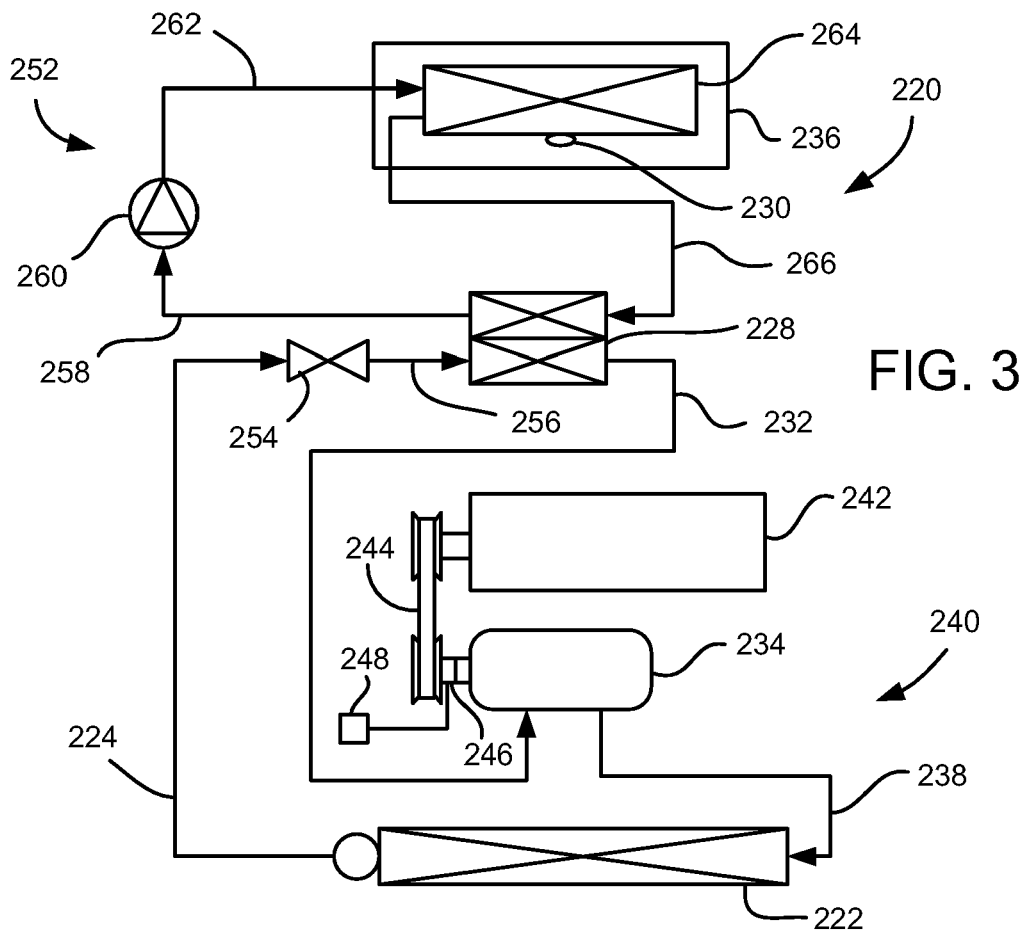
FIG. 3 is a schematic view similar to FIG. 1, but illustrating yet another type of cold storage feature.

FIG. 3 illustrates another embodiment. Since this embodiment is similar to the first, similar element numbers will be used for similar elements, but employing 200-series numbers. This air conditioning system 220 is a secondary loop type of system—that is, the system includes a primary refrigerant loop 240 and a secondary coolant loop 252.

The primary loop 240 includes a compressor 234 that is driven by an engine 242 via a belt-and-pulley assembly 244 and can be selectively disengaged by a compressor clutch 246. A controller 248 still controls the engagement and disengagement of the clutch 246. A refrigerant line 238 directs the refrigerant to a condenser 222, a second refrigerant line 224 directs the refrigerant from the condenser 222 to an expansion device 254, a third refrigerant line 256 directs the refrigerant to a chiller 228, and a fourth refrigerant line 232 directs the refrigerant back to the compressor 234 to complete the primary loop 240.

The chiller 228 acts as the cold storage tank for this air conditioning system 220. Thus, the chiller 228 provides the thermal inertia when the compressor clutch 246 is temporarily disengaged. The chiller 228 is a refrigerant-to-liquid heat exchanger and is also part of the secondary loop 252.

The secondary loop 252 employs a coolant or some other type of cooled liquid that flows through the loop 252. The chiller 228 directs the coolant, via a coolant line 258, to a pump 260, which can be selectively activated. Another coolant line 262 directs the coolant from the pump 260 to a cooler 264 located in the HVAC module 236. The cooler 264, in effect, acts as an evaporator does in a conventional air conditioning system, so a thermistor 230 mounted adjacent to the cooler 264 measures the EAT (evaporator air temperature). Another coolant line 266 directs the coolant from the cooler 264 back to the chiller 228 to complete the secondary loop 252.

Figure 4A:
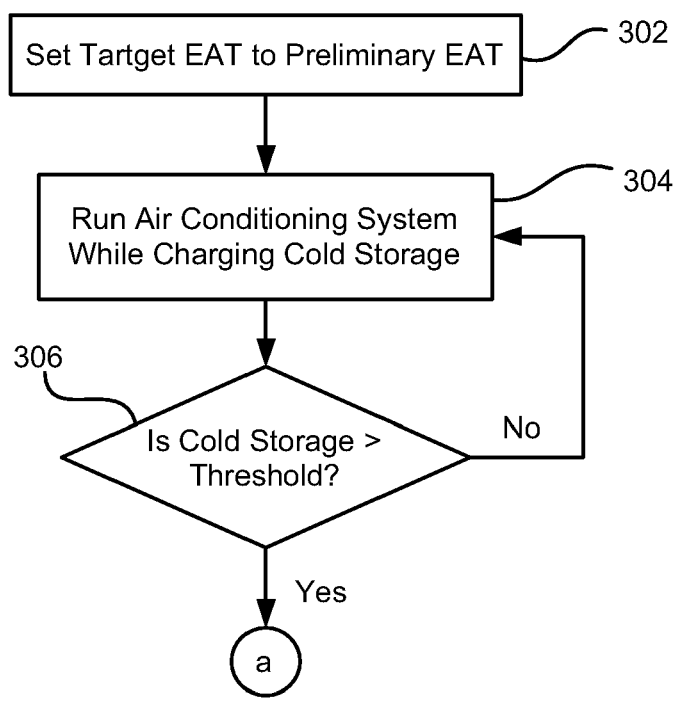
FIGS. 4A-4C show a flow chart illustrating a method of operating any one of the air conditioning systems of FIGS. 1-3.
Figure 4B:
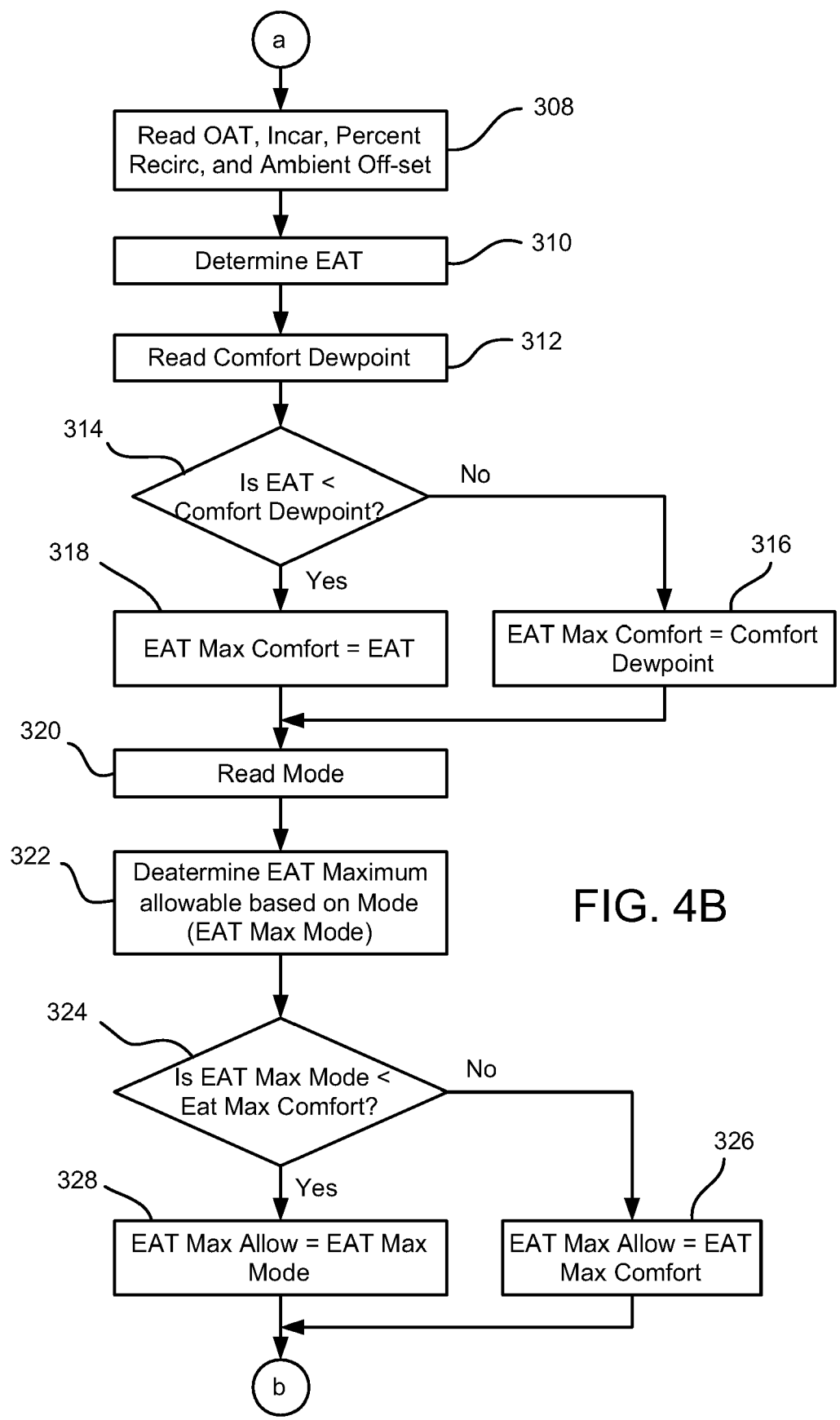
Figure 4C:
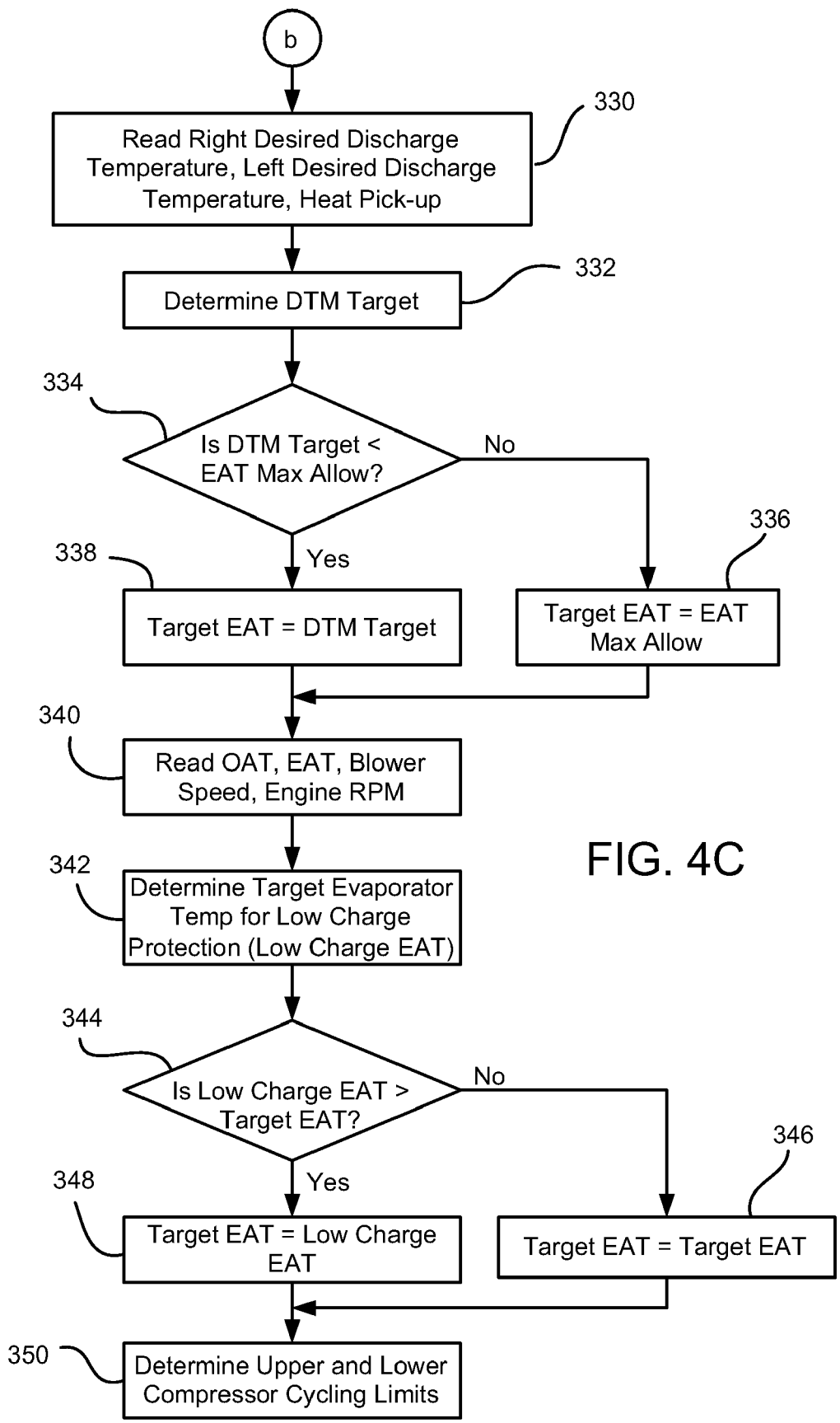

FIGS. 4A-4C show a flow chart for a method that may be advantageously employed with any of the air conditioning systems of FIGS. 1-3, although the flow chart will be discussed with reference specifically to the system of FIG. 1.

To begin the process, a target EAT (evaporator air temperature) is set to a preliminary EAT, block 302. The preliminary EAT is set to a low temperature so that the air conditioning system 20, while being run, will charge the cold storage 28, block 304. That is, initially, the controller 48 will maintain the compressor clutch 46 in an engaged position in order to continuously drive the compressor 34. This also provides maximum initial cool down for a passenger compartment of the vehicle. As long as the cold storage has not reached a predetermined threshold, block 306, this initial operation will continue. The predetermined threshold may be, for example, a function of compressor run time or a measured temperature of the particular thermal storage medium itself. When the cold storage reaches a predetermined threshold, block 306, then the system is ready to determine if the target EAT can be adjusted in order to improve vehicle fuel economy.

A new target EAT is determined by finding the lowest acceptable EAT from different operating factors. The controller 48 then cycles the compressor 34 off and on (via the clutch 46) to reach the desired EAT. The thermal storage 28 improves the overall performance of the air conditioning system 20 employing this control method by reducing the number of times that the compressor clutch 46 is cycled while also providing thermal inertia to minimize changes in outlet air temperature to the passenger compartment. The biggest improvement in fuel economy is believed to be when the air conditioning system 20 is operating under low to medium cooling/dehumidifying load conditions.

A first factor is evaporator inlet temperature. This first factor maintains the EAT to below the dew point. Outside air temperature (OAT), the temperature in the passenger compartment (Incar), the percentage of recirculated air through the HVAC module 36 (Percent Recirc), and an ambient off-set are read, block 308. The outside air temperature and the temperature in the passenger compartment can each be read with conventional temperature sensor arrangements (not shown). The percentage of recirculated air versus the percentage of fresh air intake can be determined by a position of a conventional blend door (not shown). The ambient off-set looks at ambient air temperature and then off-sets this temperature by a certain amount in order to assure that fogging on the vehicle glass is avoided. The ambient off-set may be, for example, about two degrees Celsius. The EAT is determined, block 310. This may be a temperature measurement taken from the thermistor 30.

Another factor is the maximum allowable EAT that will maintain a humidity level considered comfortable for passengers. A Comfort Dewpoint is read, block 312. The Comfort Dewpoint limits the target EAT to a maximum of, for example, about ten degrees Celsius when there is no relative humidity sensor in the vehicle to determine the humidity level directly. Otherwise, passengers in the vehicle may feel less comfortable due to higher than desirable humidity level—even if the temperature is in a desirable range. If the EAT is not less than the temperature set for the Comfort Dewpoint, block 314, then a temperature value EAT Max Comfort is set equal to the Comfort Dewpoint temperature, block 316. If the EAT is less than the temperature set for the Comfort Dewpoint, block 314, then the temperature value EAT Max Comfort is set equal to the EAT temperature value, block 318.

Another factor is the maximum allowable EAT value based on the air conditioning mode. That is, for certain modes, it is desirable to set a low EAT value to accomplish a window defrost or defog quickly, versus other modes where speed to achieve a reduced humidity level is not as important. The different modes may be, for example, defrost/defog, panel, bi-level and floor. The air conditioning mode is read, block 320. The maximum EAT for the particular air conditioning mode (EAT Max Mode) is determined, block 322. These may be, for example, a maximum EAT of ten degrees Celsius for panel, bi-level and floor modes and one degree Celsius for defrost/defog mode. If the EAT Max Mode is not less than the EAT Max Comfort temperature value, then a temperature EAT Max Allow is set equal to EAT Max Comfort, block 326. If the EAT Max Mode is less than the EAT Max Comfort value, then the EAT Max Allow is set equal to EAT Max mode, block 328.

Yet another factor is the lowest temperature setting value of a right hand and left hand discharge temperature monitor (DTM). This is used for air conditioning systems that allow for separate right and left side temperature settings in the passenger compartment. A right desired discharge temperature, a left desired discharge temperature, and a heat pick up value are read, block 330. A DTM Target temperature value is determined, block 332. For this factor, for example, a DTM Target correction may be adjusted by two degrees Celsius to account for the heat pick-up, which may be a calibrated value associated with the particular vehicle. If the DTM Target is not less than the EAT Max Allow, block 334, then a Target EAT is set equal to EAT Max Allow, block 336. If the DTM Target is less than the EAT Max Allow, block 334, then the Target EAT is set equal to the DTM Target, block 338. Accordingly, the Target EAT at this point is the highest EAT temperature value that will provide an acceptable EAT for all four of the factors discussed above.

At this point, a low charge algorithm determines an acceptable EAT based on protecting for low refrigerant charge. The outside air temperature (OAT) (already read above), current EAT, speed of an HVAC blower (not shown), and speed of the engine 142 are read, block 340. A target evaporator temperature for low refrigerant charge protection (Low Charge EAT) is determined, block 342. If the Low Charge EAT is not greater than the Target EAT, block 344, then the Target EAT is left equal to the current Target EAT. On the other hand, if the Low Charge EAT is greater than the Target EAT, block 344, then the Target EAT is set equal to the Low Charge EAT, block 348.

The upper and lower compressor cycling limits are set, block 350, and the controller 48 then actuates the compressor clutch 46 to obtain and maintain the Target EAT. The limits are set to account for a lag time in measurement of EAT to allow for the desired amount of overshoot and undershoot to average out to the Target EAT. The cycle time for the clutch 46 can be greater due to the cold thermal energy stored in the cold storage 28. Moreover, the thermal inertia created by the cold storage 28 allows for a more consistent evaporator outlet temperature (EAT) while cycling the compressor 34 off and on.

While certain embodiments of the present invention have been described in detail, those familiar with the art to which this invention relates will recognize various alternative designs and embodiments for practicing the invention as defined by the following claims.

What is claimed is:

1. A method of operating a vehicle air conditioning system having an engine driven, fixed capacity refrigerant compressor selectively disengageable from an engine by a compressor clutch, the method comprising the steps of:
   (a) setting a preliminary evaporator air temperature target;
   (b) charging a cold storage apparatus in the vehicle air conditioning system;
   (c) determining when the cold storage apparatus has reached a predetermined threshold;
   (d) when the cold storage apparatus has reached the predetermined threshold, determining a new evaporator air temperature target by: determining a maximum allowable dewpoint evaporator air temperature for maintaining a passenger compartment humidity below a predetermined value; determining a maximum allowable mode evaporator air temperature based on a mode to which the vehicle air conditioning system is set; and setting the new evaporator air temperature target to a lower one of the dewpoint evaporator air temperature and the mode evaporator air temperature; and
   (e) controlling the compressor clutch to achieve the new evaporator air temperature target.

2. The method of claim 1 including, (f) determining a low charge evaporator air temperature based on air conditioning system low refrigerant charge protection, and (g) setting the new evaporator air temperature target to the higher temperature value of the new evaporator air temperature target and the low charge evaporator air temperature.

3. The method of claim 1 wherein step (d) is further defined by determining a left/right evaporator air temperature based on a difference between a right hand passenger compartment temperature setting and a left hand passenger compartment temperature setting, and wherein the new evaporator air temperature target is set to a lower one of the dewpoint evaporator air temperature, the mode evaporator air temperature, and the left/right evaporator air temperature.

4. The method of claim 1 wherein step (d) is further defined by the mode evaporator air temperature having a higher maximum allowable evaporator air temperature when a mode is one of panel, bi-level and floor than when the mode is one of defrost/defog.

5. The method of claim 1 wherein step (d) is further defined by the maximum allowable for the dewpoint evaporator air temperature being based on air in a vehicle passenger compartment remaining below a predetermined maximum allowable humidity level in the vehicle passenger compartment.

6. The method of claim 1 wherein step (d) is further defined by determining a maximum allowable anti-fogging evaporator air temperature based on an outside ambient air temperature, an in-vehicle air temperature, and a percentage of recirculated air, and wherein the new evaporator air temperature target is set to a lower one of the dewpoint evaporator air temperature, the mode evaporator air temperature, and the anti-fogging evaporator air temperature.

7. The method of claim 1 wherein step (b) is further defined by the cold storage apparatus being a portion of an evaporator assembly including a phase change material therein, with the cold storage apparatus being charged as a cooled refrigerant passes through the evaporator assembly.

8. The method of claim 1 wherein step (b) is further defined by the cold storage apparatus being charged being a cold storage tank located downstream of an outlet of an evaporator assembly and upstream of an inlet to the refrigerant compressor.

9. The method of claim 8 comprising:
(f) prior to step (b), a refrigerant flowing from the evaporator assembly being redirected to bypass the cold storage tank during an initial vehicle cool-down period, and the refrigerant being directed to flow through the cold storage tank after the initial vehicle cool-down period.

10. The method of claim 1 wherein step (b) is further defined by the cold storage apparatus being charged being a refrigerant-to-liquid heat exchanger, and wherein the vehicle air conditioning system includes a primary refrigerant loop directing refrigerant through the refrigerant-to-liquid heat exchanger and a secondary liquid loop directing a liquid through the refrigerant-to-liquid heat exchanger.

11. A vehicle air conditioning system comprising:
an engine driven, fixed capacity refrigerant compressor;
a compressor clutch operatively engaging the refrigerant compressor and configured to selectively disengage the refrigerant compressor from being driven by an engine;
one of an evaporator and a refrigerant-to-liquid heat exchanger;
a cold storage apparatus being located in one of the evaporator, the refrigerant-to-liquid heat exchanger or downstream of the evaporator; and
a controller configured to set a preliminary evaporator air temperature target; charge the cold storage apparatus; determine when the cold storage apparatus has reached a predetermined threshold; and, when the cold storage apparatus has reached the predetermined threshold, determine a new evaporator air temperature target by: determining a maximum allowable dewpoint evaporator air temperature for maintaining a passenger compartment humidity below a predetermined value; determining a maximum allowable mode evaporator air temperature based on a mode to which the vehicle air conditioning system is set; setting the new evaporator air temperature target to a lower one of the dewpoint evaporator air temperature and the mode evaporator air temperature; the controller further configured to control the compressor clutch to achieve the new evaporator air temperature target.

12. The vehicle air conditioning system of claim 11 wherein the cold storage apparatus is located in the evaporator and includes a phase change material.

13. The vehicle air conditioning system of claim 11 wherein the cold storage apparatus is a cold storage tank located downstream of the evaporator assembly and upstream of an inlet to the refrigerant compressor.

14. The vehicle air conditioning system of claim 13 including a bypass valve configured to selectively direct a refrigerant through the cold storage tank or to bypass the cold storage tank.

15. The vehicle air conditioning system of claim 11 wherein the cold storage apparatus is in the refrigerant-to-liquid heat exchanger, and wherein the vehicle air conditioning system includes a primary refrigerant loop directing refrigerant through the refrigerant-to-liquid heat exchanger and a secondary liquid loop directing a liquid through the refrigerant-to-liquid heat exchanger.

* * * * *